(12) United States Patent
Solomon

(10) Patent No.: US 11,230,996 B2
(45) Date of Patent: Jan. 25, 2022

(54) SYSTEM AND METHOD FOR ACTIVE INJECTION INTO FLUID STREAMS

(71) Applicant: TUSKEGEE UNIVERSITY, Tuskegee, AL (US)

(72) Inventor: John Solomon, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 374 days.

(21) Appl. No.: 16/234,986

(22) Filed: Dec. 28, 2018

(65) Prior Publication Data

US 2019/0211777 A1 Jul. 11, 2019

Related U.S. Application Data

(60) Provisional application No. 62/611,349, filed on Dec. 28, 2017.

(51) Int. Cl.
*F02K 9/52* (2006.01)
*F02K 7/02* (2006.01)

(52) U.S. Cl.
CPC . *F02K 7/02* (2013.01); *F02K 9/52* (2013.01)

(58) Field of Classification Search
CPC .................................. F02K 7/02; F02K 9/52
See application file for complete search history.

(56) References Cited

U.S. PATENT DOCUMENTS

| 3,603,092 A | * | 9/1971 | Paine | F02K 9/52 60/258 |
|---|---|---|---|---|
| 3,702,536 A | * | 11/1972 | Gregory | F02K 9/805 60/211 |

(Continued)

OTHER PUBLICATIONS

Strickland et al., "Implementing Resonant Enhanced Pulsed Micro-Actuators for the Control of Supersonic Impinging Jets", AIAA-2012-0065, 50th AIAA Aerospace Sciences Meeting including the New Horizons Forum and Aerospace Exposition, Nashville, Tennessee, Jan. 9-12, 2012, pp. 1-14. (Year: 2012).*

(Continued)

*Primary Examiner* — Lorne E Meade
(74) *Attorney, Agent, or Firm* — Terry M. Sanks, Esq.; Beusse Sanks, PLLC

(57) ABSTRACT

Embodiments of the present disclosure include an injection system. The injection system includes a Resonance Enhanced Microjet (REM) nozzle. The REM nozzles includes a REM nozzle block, the REM nozzle block having an inlet formed in a top and an outlet formed in a bottom, the inlet and outlet being fluid coupled together. The REM nozzle also includes one or more micronozzles positioned about the outlet, the one or more micronozzles having an outlet and being positioned at an angle relative to the bottom. Additionally, the REM nozzle includes an inlet conduit coupled to the REM nozzle block, the inlet conduit being fluidly coupled to the one or more micronozzles. The injection system also includes a source arranged proximate the top, the source directing a source jet of fluid into the inlet. The injection system includes a fuel supply fluidly coupled to the inlet conduit. Such a system can inject a fuel entrained in an oxidizer pulsing at very high-frequency. These pulsed fuel-oxidizer streams can be injected to a high-velocity fluid stream which allows better mixing of fuel and oxidizer at high speed.

16 Claims, 14 Drawing Sheets

(56) References Cited

U.S. PATENT DOCUMENTS

| | | | | |
|---|---|---|---|---|
| 4,586,226 A * | 5/1986 | Fakler | ............ | C25D 1/02 |
| | | | | 164/46 |
| 4,801,092 A * | 1/1989 | Webber | ............ | B05B 7/0807 |
| | | | | 239/418 |
| 5,644,918 A * | 7/1997 | Gulati | ............ | F23R 3/002 |
| | | | | 431/114 |
| 5,771,579 A * | 6/1998 | Farhangi | ............ | F02K 9/52 |
| | | | | 29/890.01 |
| 6,802,178 B2 * | 10/2004 | Sprouse | ............ | F23K 5/22 |
| | | | | 60/39.463 |

OTHER PUBLICATIONS

Solomon, John T. et al., "Design and Characterization of High-Bandwidth, Resonance Enhanced Pulsed Microactuators: A Parametric Study," AIAA Journal, Feb. 2013, vol. 51, No. 2, Tallahassee, Florida.

* cited by examiner

1mm Nozzle (for Pulsed Air Jet) Surrounded by 4 x 400μm Nozzles
(for Steady Injection of Fluid to be Mixed with Air)

Bottom View of REM Nozzle Block

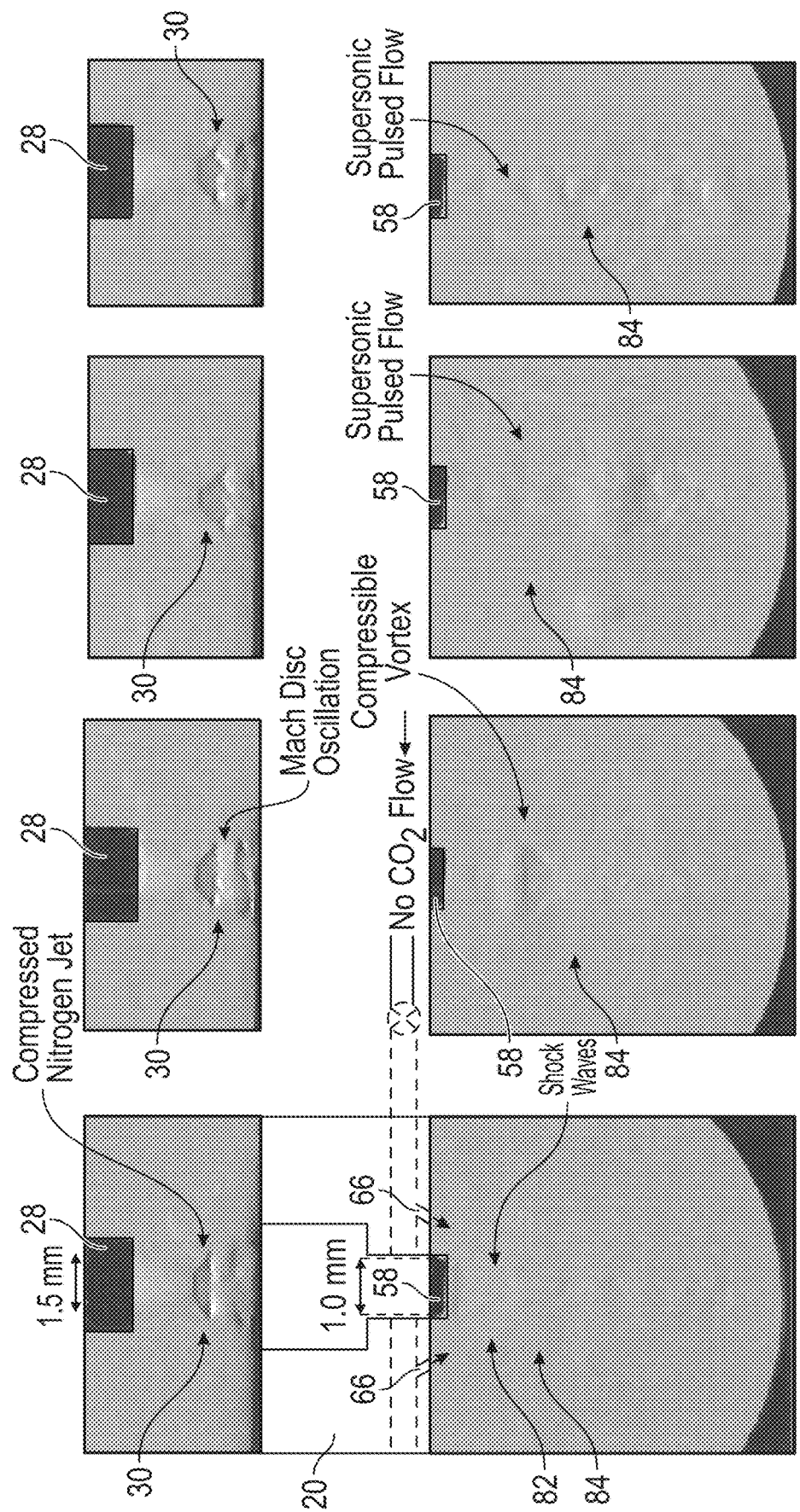

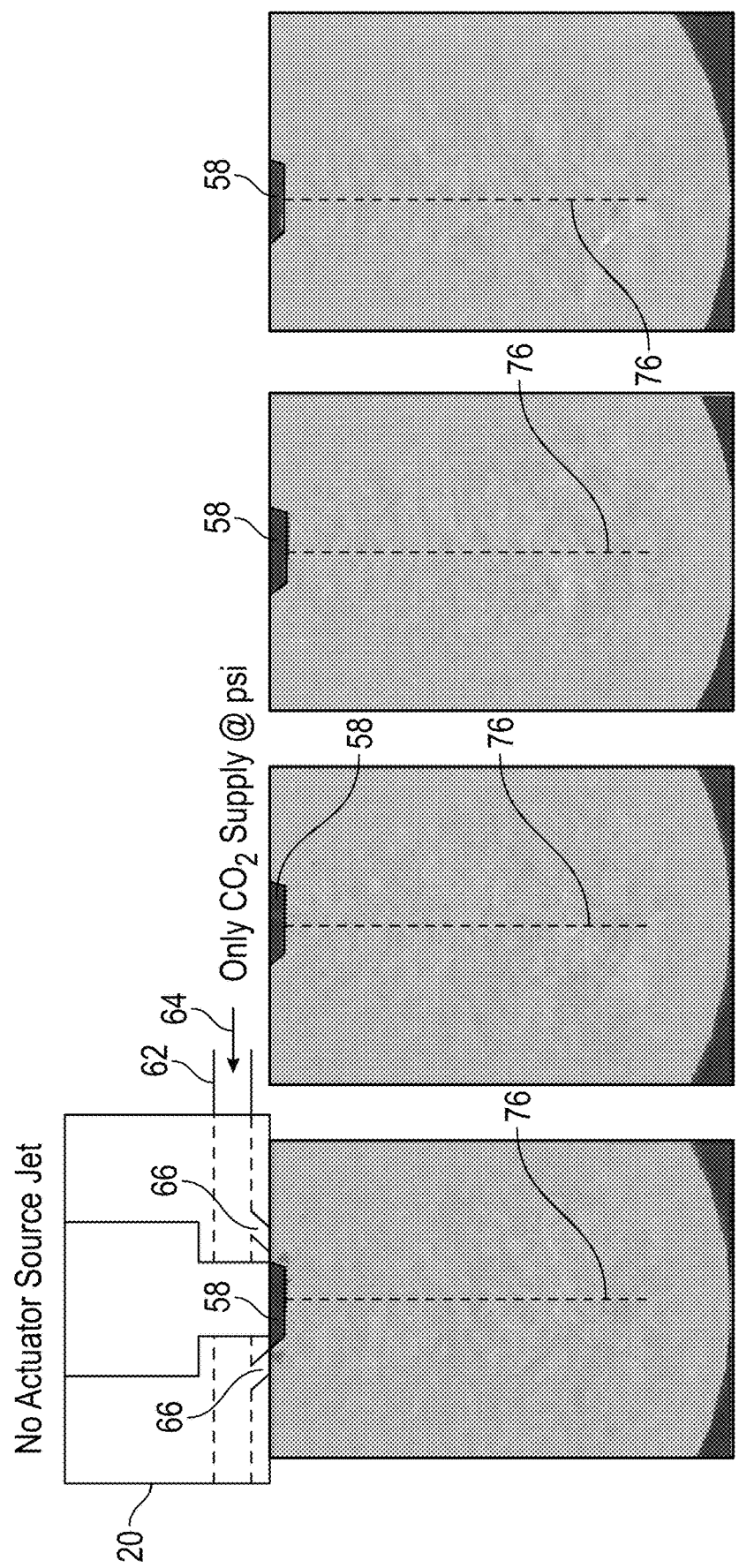

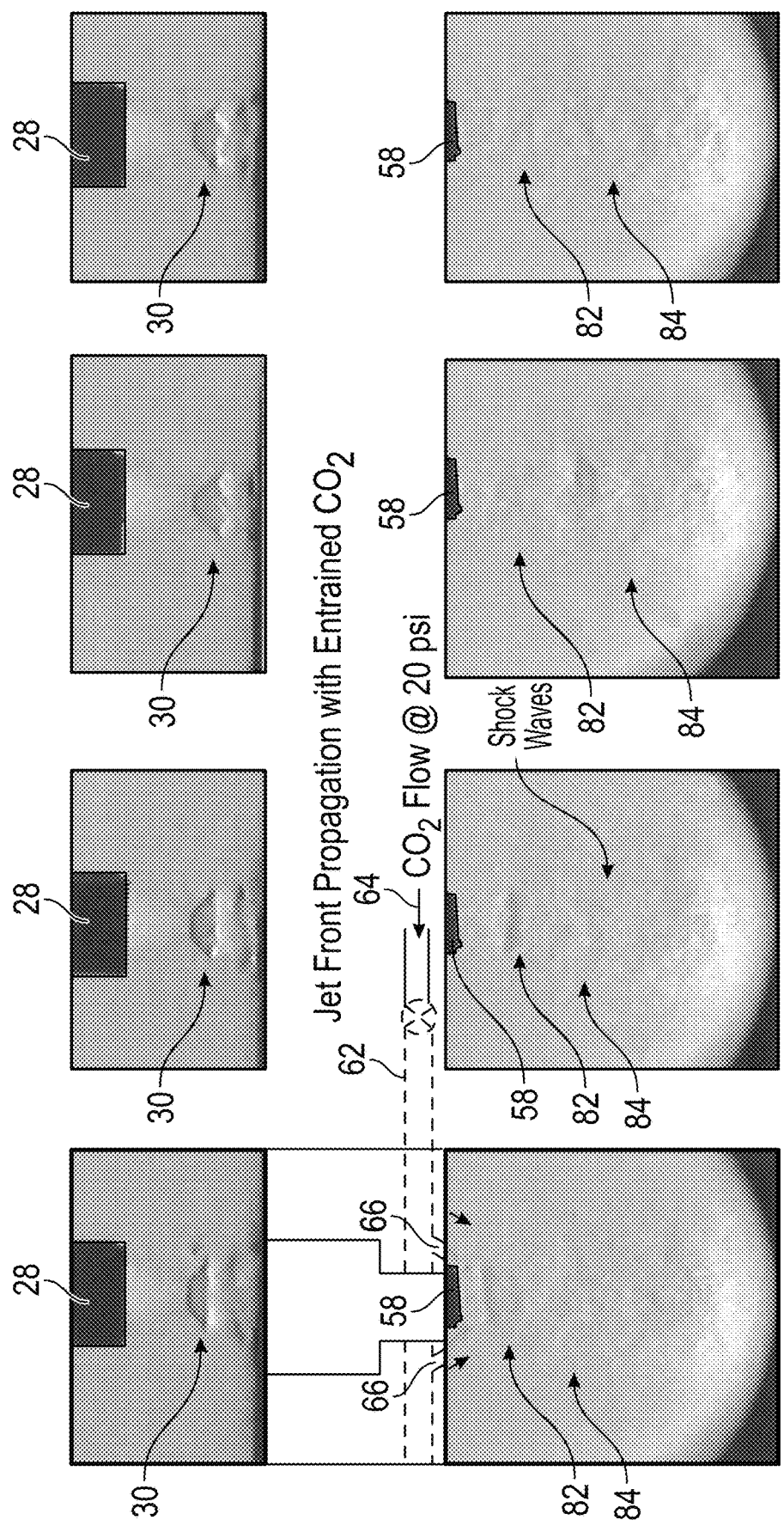

SYSTEM AND METHOD FOR ACTIVE INJECTION INTO FLUID STREAMS

PRIORITY APPLICATION

This application claims priority to U.S. provisional application 62/611,349 filed on Dec. 28, 2017, which application is herein incorporated by reference in its entirety.

GOVERNMENT LICENSE RIGHTS

This invention was made with government support under Grant 1504865 awarded by National Science Foundation. The government has certain rights in the invention.

BACKGROUND

1. Field of the Invention

The present disclosure relates to active fluid injection systems. More particularly, the present disclosure relates to systems and methods for injecting fluids actively into high-speed flow streams for mixing.

2. Description of Related Art

High-speed fluid mixing may be utilized in power generation, such as jet engines. In applications, an oxidizer is accelerated at a fast rate, often greater than Mach 1 (i.e., a speed greater than the speed of sound), toward a combustion chamber. In the combustion chamber, a fuel may be injected into the flow stream comprising the oxidizer to initiate combustion and subsequent power generation. In certain power generation scenarios, the time the fuel and oxidizer are in the combustion chamber may be short, often only milliseconds. As a result, rapid and substantially complete mixing of the fuel and oxidizer is needed to provide efficiency related to both power generation and fuel consumption. In certain embodiments, injection nozzles utilized for sub-sonic jet engines or power generation turbines may be unsuitable for the fast mixing occurring at supersonic speeds. It is now recognized that injection nozzles capable of providing efficient mixing and dispersion in supersonic oxidizer flow streams are desired.

SUMMARY

Applicants recognized the problems noted above herein and conceived and developed systems and methods for active injection and mixing of fuels in supersonic flow streams.

In certain embodiments, a Resonance Enhanced Microjet (REM) nozzle (e.g., REM actuator) is utilized to convert a steady stream source fluid jet into a pulsed fluid jet without utilizing additional moving parts, such as valves, controllers, or the like. For instance, the REM nozzle may be formed from a REM nozzle block comprising one or more layers of metallic pieces mechanically coupled together via fasteners and/or adhesives. However, it should be appreciated that, in certain embodiments, the one or more layers may not be metallic and may be a plastic or composite material. The REM nozzle block includes an inlet to receive the source fluid jet through a nozzle from a source, such as a compressed air bottle, redirected air stream, or the like. The inlet directs the fluid jet through various chambers and cavities toward an outlet at a bottom of the REM nozzle block. While in the REM nozzle block, the fluid jet resonates resulting in pressure and/or velocity changes to thereby exit the REM nozzle block as a pulsed fluid jet. For example, the outlet of the REM nozzle block may be smaller than the outlet from the source. Additionally, the various chambers and passages in the REM nozzle block may further enable a pulsed flow. In certain embodiments, the frequency of the pulsed jet may be adjusted by changing one or more geometric or flow parameters of the source jet and/or the REM nozzle block. For example, adjusting the distance of the source jet from the REM nozzle block may be utilized to change the frequency of the pulse jet. Moreover, adjusting the outlet pressure of the source jet may also be utilized to tune the frequency of the pulse jet.

In certain embodiments, the pulse jet described above may exit the outlet of the REM nozzle block and form a compressible vortex that may be utilized to capture and entrain a fluid, such as a fuel. In embodiments, the REM nozzle block includes one or more inlet conduits to direct a fuel, such as methane or the like, toward one or more micronozzles arranged about the outlet of the REM nozzle block. In certain embodiments, the micronozzles may be formed substantially symmetrically about the outlet and further positioned at an angle relative to a bottom plane of the REM nozzle block. Arranging the micronozzles at the angle may direct the output fuel toward the compressible vortex generated by the pulsed air jet, thereby facilitating entrainment and mixing of the fuel and the pulsed air jet. This compressible air vortex generated at very high frequency rates entrained with fuel efficiently mixes together due to the increased interfacial area generated between air and fuel. Moreover, the pulsed jet that captures the fuel may drive the fuel-air mixture into a central portion of a cross-directional flow stream, thereby facilitating mixing in the flow stream.

In an embodiment, the REM nozzle described herein may be utilized with supersonic jet engines, such as a scramjet. In operation, the scramjet may be moving in speeds faster than Mach 1 and compress upstream air toward a combustion chamber. The compressed air may be in the combustion chamber for a short period of time, often only milliseconds, and therefore rapid and complete mixing of fuels to enable combustion is desirable. The REM nozzle described herein may be utilized to enhance mixing in supersonic flow streams, thereby improving combustion efficiencies.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIGS. 8(A)-(D) are a time lapse pictorial representation of an output pulsed jet, in accordance with embodiments of the present disclosure;

FIGS. 9(A)-(D) are a time lapse pictorial representation of an output fuel injection, in accordance with embodiments of the present disclosure;

FIGS. 10(A)-(D) are a time lapse pictorial representation of a compressible vortex mixing an injected fuel, in accordance with embodiments of the present disclosure.

DETAILED DESCRIPTION

Figure 1:
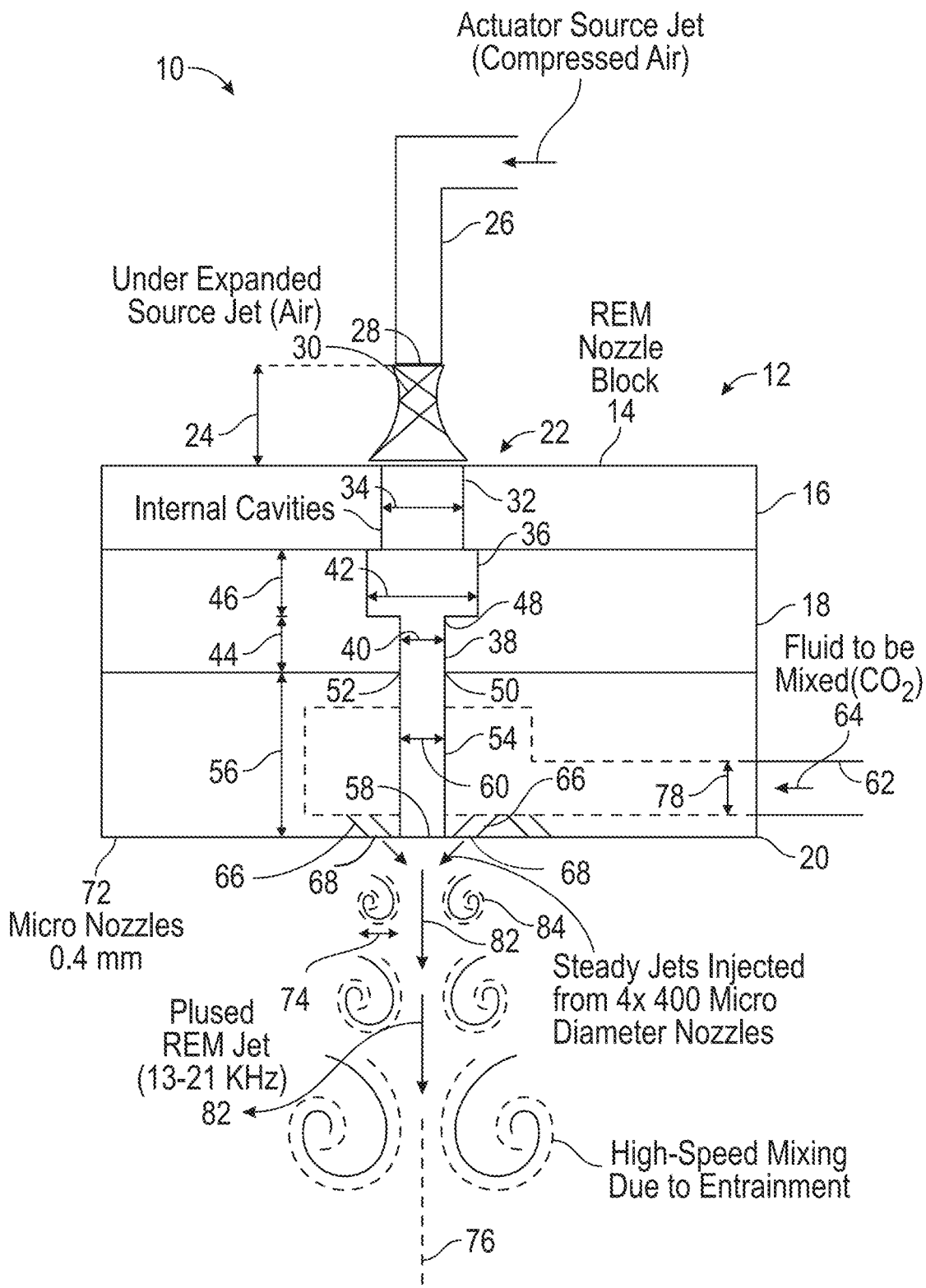
FIG. 1 is a schematic side elevational view of an embodiment of a fuel injection system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a Resonance Enhanced Microjet (REM) nozzle formed by a REM nozzle block to facilitate injection and mixing into a flow stream. In certain embodiments, the REM nozzle block includes an inlet that receives a source jet from a fluid source, such as a compressed or reclaimed air source. This inlet directs the source jet through the REM nozzle block toward an outlet. In embodiments, the geometric configuration of the REM nozzle block, as well as the relationship with the source, enable the source jet to leave the outlet of the REM nozzle block as a pulsed jet operating at a frequency. In certain embodiments, the frequency may be between 20 and 70 kHz. The REM nozzle block also includes an inlet conduit to direct fuel toward one or more micronozzles arranged about the outlet of the REM nozzle block. In embodiments, the micronozzles are arranged at an angle relative to a bottom plane of the REM nozzle block to thereby direct the fuel toward the pulsed jet, which may form a compressible vortex at the outlet to entrain the fuel. As a result, the fuel is mixed with the pulsed jet and injected into the flow stream. In certain embodiments, parameters of the REM nozzle block and/or the system may be adjusted to tune the frequency of the REM nozzle. For instance, the interior volume of the REM nozzle block may be adjusted. Moreover, the location of the source relative to the inlet may be adjusted. In this manner, the frequency can be particularly selected based on the application for the REM nozzle block. In certain embodiments, the REM nozzle may be utilized in supersonic flow streams where rapid mixing is desirable.

FIG. 1 is a schematic diagram of an embodiment of an injection and mixing system 10 including a Resonance Enhanced Microjet (REM) nozzle 12 (e.g., REM actuator, actuator, nozzle, etc.), in accordance with embodiments of the present disclosure. It should be appreciated that certain features of the REM nozzle 12 illustrated in FIG. 1 are shown in cross section for clarity. The illustrated REM actuator 12 includes a REM nozzle block 14 which, as will be described below, may be formed from one or more layers of metallic plates coupled together via a fastener, such as a screw. However, it should be appreciated that the REM nozzle block 14 may be otherwise constructed as a solid piece, such as through machining, casting, 3D printing, or any other reasonable manufacturing method. In the illustrated embodiment, the layers forming the REM nozzle block 14 include an inlet layer 16, a converging layer 18, and a mixing layer 20. As will be described below, one or more features of the layers 16, 18, and 20 enable efficient injection and mixing into fluid flow streams, such as but not limited to supersonic flow streams. It should be appreciated that, as used herein, fluid refers to any gas, liquid, solid, or combination thereof.

The illustrated inlet layer 16 includes an inlet 22 positioned in a spaced relationship, as represented by a distance 24, from a source 26. As used herein, a spaced relationship refers to a finite quantity of space between objects that can be physically measured. For example, in embodiments of the present disclosure the distance 24 may be equal to approximately 1 mm, 1.5 mm, 2 mm, and the like. As will be described below, in certain embodiments one or more ratios may be calculated utilizing the distance 24 and therefore one or ordinary skill in the art, having the benefit of the present disclosure, could determine the distance 24 being given the ratio and other quantities utilized to calculate the ratio. The source 26 may provide a fluid (e.g., gas, liquid, solid, combination thereof), such as compressed air, to facilitate mixing within the fluid flow stream. As illustrated in FIG. 1, and as will be described below, an outlet 28 (e.g., an outlet inner diameter) of the source 26 is smaller than the inlet 22 (e.g., an inner diameter of the inlet 22). The source jet 30, comprising the fluid such as compressed air, will expand before entering the inlet 22. As shown in FIG. 1, the inlet layer 16 directs the source jet 30 toward the converging layer 18 via a cavity 32. It should be appreciated that while the embodiment illustrated in FIG. 1 includes one cavity 32, in other embodiments there may be 2, 3, 4, 5, 6, 7, 8, 9, 10 or any reasonable number of cavities 32. Additionally, while the illustrated cavity 32 includes a substantially constant inner diameter 34, in other embodiments the cavity 32 may converge or expand toward the converging layer 18.

The inlet layer 16 directs the source jet 30 to the converging layer 18 via the cavity 32 through a chamber 36 in the converging layer 18. It should be appreciated that, in certain embodiments, there may be one or more seals arranged between the converging layer 18 and the inlet layer 16 to provide a fluid tight or substantially fluid tight flow path for the source jet 30. In the illustrated embodiment, the converging layer 18 includes the chamber 36 coupled to a passage 38. As shown in FIG. 1, the passage 38 has a smaller internal diameter 40 than an internal diameter 42 of the chamber 36. However, it should be appreciated that the internal diameter 40 may be equal to the internal diameter 42 or may be larger than the internal diameter 42 in other embodiments. Furthermore, it should be appreciated that while the respective internal diameters 40, 42 of the passage 38 and the chamber 36 are illustrated as being substantially constant over respective lengths 44, 46, in other embodiments the internal diameters 40, 42 may converge or divert over the respective lengths 44, 46. Moreover, while a transition 48 between the chamber 36 and the passage 38 is illustrated as being substantially 90 degrees, in other embodiments the transition 48 may be tapered, angled, curved, or otherwise shaped.

The REM nozzle block 14 also includes the mixing layer 20 that is communicatively coupled to an outlet 50 of the passage 38 in the converging layer 18. The mixing layer 20 includes an inlet 52 that is substantially aligned with the outlet 50. As shown, a passage 54 extends through the mixing layer 20 over a length 56 toward an outlet 58. In the illustrated embodiment, an internal diameter 60 of the passage 54 is substantially equal to the internal diameter 40 of the passage 38. That is, the passages 38, 54 may be continuous. Furthermore, the internal diameter 60 is substantially constant along the length 56. It should be appreciated that in other embodiments the internal diameter 60 may be larger or smaller than the internal diameter 40 and may also converge or diverge along the length 56.

The illustrated mixing layer 20 includes an inlet conduit 62 for directing a fuel 64 into the mixing layer 20. As shown, the conduit 62 is coupled to micronozzles 66 positioned about the outlet 58. These micronozzles 66 may be arranged substantially symmetrically about the passage 54 and/or outlet 58, as will be described in detail below. In certain embodiments, the conduit 62 directs the fuel 64 to the micronozzles 66 (for example, via a flow path or pocket formed in the mixing layer 20). The fuel 64 is subsequently directed out of the mixing layer 20 via openings 68 in the micronozzles 66. The fuel 64 subsequently mixes with the source jet 30 traveling through the outlet 58. Upon exit, the source jet 30 may create a compressible vortex (e.g., eddies, vortex) in which the fuel 64 from the micronozzles 66 is entrained, thereby facilitating high speed mixing. In the illustrated embodiment, the micronozzles 66 are positioned at an angle relative to a bottom plane 72 of the mixing layer 20. In certain embodiments, the angle is approximately 30 degrees. However, it should be appreciated that the angle may be approximately 10 degrees, approximately 20 degrees, approximately 40 degrees, approximately 50 degrees, or any other reasonable angle. Moreover, the angle may be between approximately 10 and 20 degrees, between approximately 20 and 30 degrees, between approximately 30 and 40 degrees, between approximately 40 and 50 degrees, or any other reasonable range. As used herein, approximately is equal to plus or minus 10 percent.

The illustrated openings 68 of the micronozzles 66 are arranged an offset distance 74 from an axis 76 of the outlet 58. That is, a center of the openings 68 may be arranged the offset distance 74 from the axis 76. As a result, the fuel 64 leaving the micronozzles 66 through the openings 68 will be directed into a cross flowing fluid stream before interacting with the source jet 30 for at least some period of time.

Returning to the inlet conduit 62, in certain embodiments the fuel 64 may be any other gas such as carbon dioxide ($CO_2$) which is injected under pressure through the inlet conduit 62. The inlet conduit 62 has an internal diameter 78 to provide sufficient fuel 62 to the micronozzles 66. Each micronozzle 66 also has an internal diameter 80 (e.g., opening 68 internal diameter) to eject the fuel 64 from the opening 68. As will be appreciated, the internal diameter 80 of the micronozzle 66 is smaller than the internal diameter 78 of the conduit 62.

In operation, as illustrated in FIG. 1, the source jet 30 will pulse through the REM nozzle 12 and out of the outlet 58 to form a pulsed REM jet 82. As will be described below, the configuration of the REM nozzle block 14 enables a steady stream from the source 26 that will be converted into the pulsed REM jet 82. In other words, the source 26 may be operating to supply a constant stream, but the configuration of the REM nozzle block 14 transforms the constant stream into a pulsed output. Advantageously, this may be accomplished without complicated and expensive valves, sensors, or controllers formed in the REM nozzle 12. Additionally, as shown in FIG. 1, as the fuel 64 exits the micronozzles 66, a compressible vortex 84 is generated by the pulsed REM jet 82 that captures the fuel 64 and entrains the fuel 64 in the pulsed REM jet 82. As a result, the fuel 64 may be mixed with the pulsed air jet while injected into a cross flowing flow stream. This also facilitates injection of the fuel 64 into a central portion of the high-speed flow stream, further improving combustion efficiency.

Figure 2:
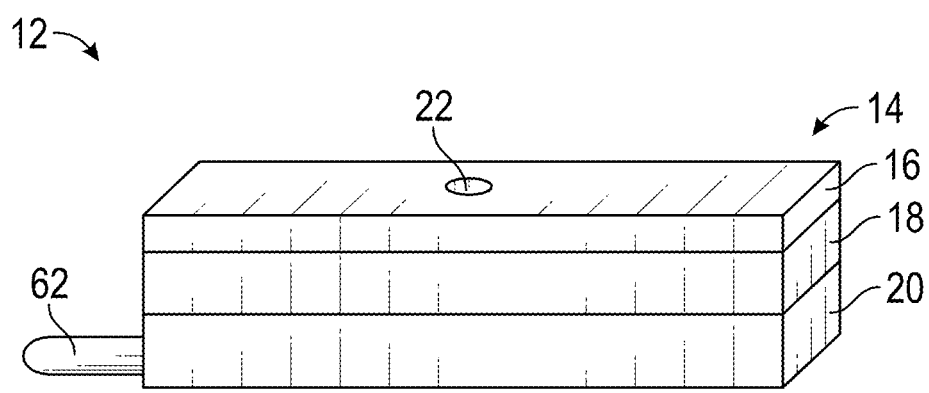
FIG. 2 is a front perspective view of an embodiment of a Resonance Enhanced Microjet (REM) nozzle, in accordance with embodiments of the present disclosure.

FIG. 2 is a front perspective view of an embodiment of the REM nozzle 12. As illustrated, the REM nozzle block 14 is substantially rectangular and includes the inlet conduit 62 extending substantially perpendicularly from a side of the REM nozzle block 14. It should be appreciated that any shape, such as a circle, oval, triangle, or the like may be utilized to form the REM nozzle block 14. In the illustrated embodiment, the inlet 22 is arranged at a top surface to receive the source jet 30 from the source 26. Additionally, the layers 16, 18, 20 are illustrated in a stacked arrangement to form the REM nozzle block 14. As described above, more or fewer layers may be included to form the REM nozzle block 14. Additionally, in certain embodiments, one or more fasteners (omitted for clarity) may be arranged to couple the layers 16, 18, 20 together. For instance, screws may extend through the REM nozzle block 14 to hold the layers 16, 18, 20 together.

Figure 3:
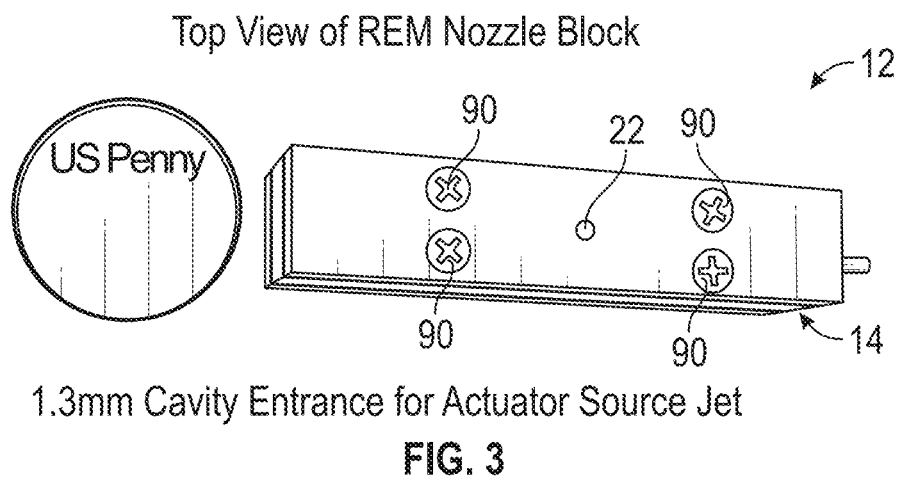
FIG. 3 is a top plan view of an embodiment of a REM nozzle, in accordance with embodiments of the present disclosure.

FIG. 3 is a top plan view of the REM nozzle 12. As illustrated, the REM nozzle 12 arranged proximate a U.S. penny to illustrate the size of the REM nozzle 12. In certain embodiments, the REM nozzle 12 may be larger or smaller than the U.S. penny illustrated in FIG. 3. The illustrated embodiment includes the inlet 22 arranged at the top of the REM nozzle 12. In FIG. 3, the inlet 22 is substantially centered in the top. However, it should be appreciated that the inlet 22 may not be centered in other embodiments. Additionally, the inlet 22 may not be in the top. For instance, the inlet 22 may be formed in a side of the REM nozzle block 14.

As shown in FIG. 3, fasteners 90 are utilized to couple the layers 16, 18, 20 together. The fasteners 90 in FIG. 3 are screws, but it should be appreciated that nails, bolts, rivets, or any other suitable fastener may be utilized. Moreover, the fasteners 90 may include adhesives, such as glues or epoxies, to couple the layers 16, 18, 20 together. As will be appreciated, the fasteners 90 are arranged such that they do not interfere with the cavity 32, passage 38, passage 54, inlet conduit 62, and/or the micronozzles 66.

Figure 4:
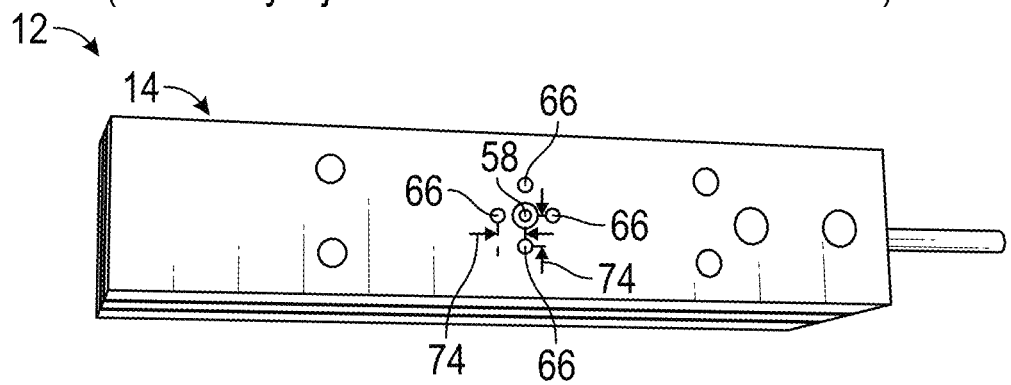
FIG. 4 is a bottom plan view of an embodiment of a REM nozzle, in accordance with embodiments of the present disclosure.

FIG. 4 is a bottom plan view of the REM nozzle 12. As shown, the micronozzles 66 are positioned around the outlet 58. The micronozzles 66 are substantially evenly spaced about the outlet 58, being at 12 o'clock, 3, o'clock, 6 o'clock, and 9 o'clock positions. It should be appreciated that the micronozzles 66 may be otherwise arranged about the outlet 58 and not necessarily symmetrical about the outlet 58. The micronozzles are positioned the offset distance 74 from the axis 76 of the outlet 58. Furthermore, in the illustrated embodiment, the outlet 58 is chamfered back into the REM nozzle block 14. In other words, in an orientation where the REM nozzle 12 is arranged such that the outlet 58 is at the bottom, the openings 68 of the micronozzles 66 are at a lower vertical elevation than the outlet 58. However, it should be appreciated that, in other embodiments, the outlet 58 and the openings 68 may be at the same vertical elevation.

Figure 5:
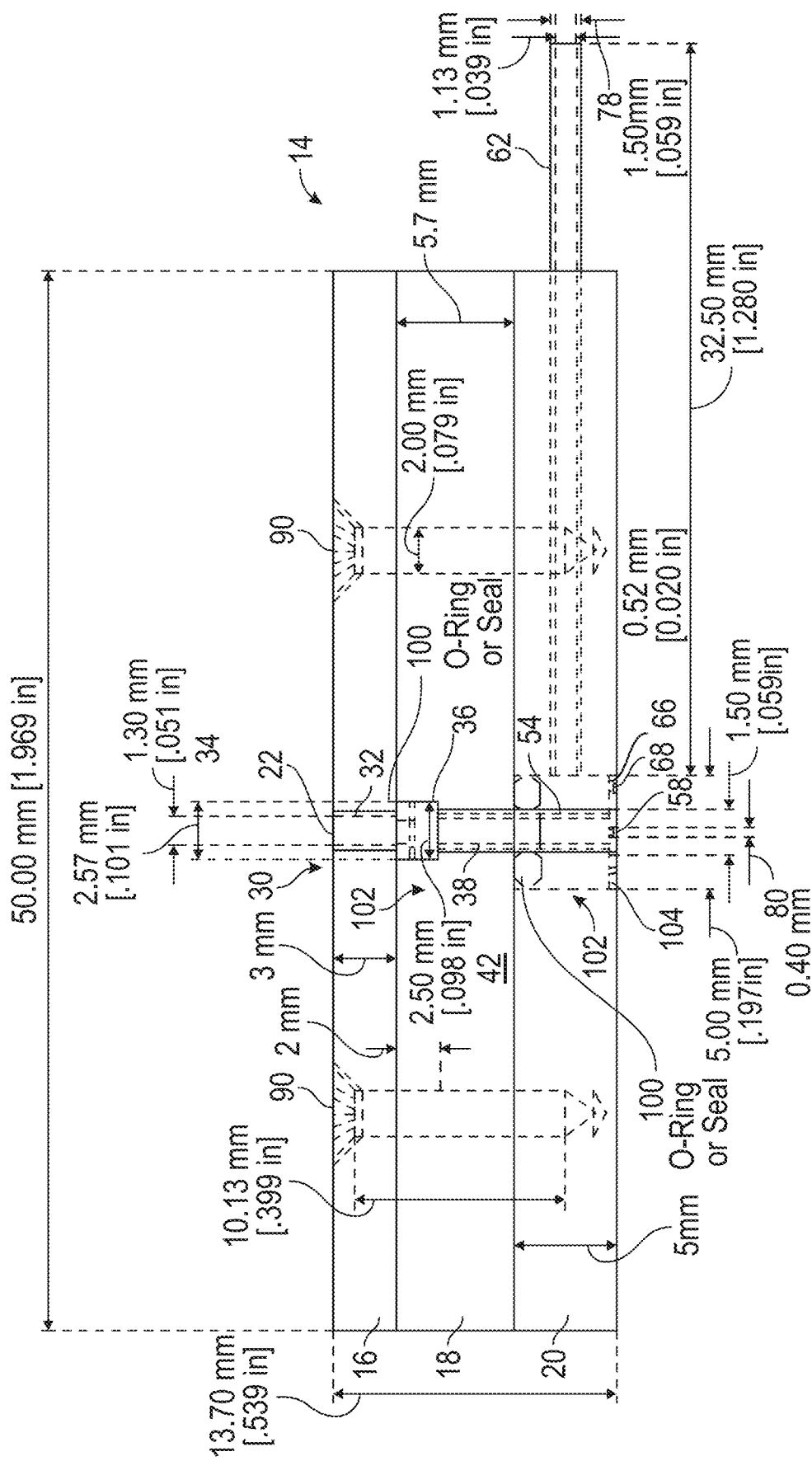
FIG. 5 is a cross-sectional side elevational view of an embodiment of a REM nozzle, in accordance with embodiments of the present disclosure.

FIG. 5 is a cross-sectional side elevational view of the REM nozzle block 14. It should be appreciated that all dimensions in FIG. 5 are for illustrative purposes only and are not intended to be limiting, but rather to illustrate proportional relationships between components of the REM nozzle block 14. As described above, the REM nozzle block 14 includes the inlet layer 16, the converging layer 18, and the mixing layer 20. The embodiment illustrated in FIG. 5 includes the fasteners 90 extending through the layers 16, 18, 20 to couple them together and thereby form the REM nozzle block 14. In the illustrated embodiment, the layers 16, 18, 20 do not have equal thicknesses, with the inlet layer 16 being thinner than both the converging layer 18 and the mixing layer 20. It should be appreciated that, in certain embodiments, the layers 16, 18, 20 may have equal thicknesses, or different layers may be thicker or thinner than other layers. Moreover, as shown, the fasteners 90 are arranged such that the internal components of the REM nozzle block 14, such as the cavity 32 or the passage 54, are not penetrated by the fasteners 90, thereby facilitating fluid transfer from the inlet 22 to the outlet 58.

As shown, the inlet 22 access to the cavity 32 having the inner diameter 34. In the illustrated embodiment, the inner diameter 34 is approximately 1.3 mm. The inner diameter 42 of the chamber 36, however, is approximately 2.5 mm, in the illustrated embodiment. Accordingly, the velocity of the source jet 30 will decrease as the source jet 30 moves toward the chamber 36 due to the increased inner diameter 42. Thereafter, the source jet 30 is directed toward the passage 38. In the illustrated embodiment, the passage 38 has an inner diameter 40 of approximately 1 mm. As such, the velocity of the source jet 30 is increased as it moves from the chamber 36 to the passage 38.

The embodiment illustrated in FIG. 5 includes seals 100 positioned at transitions between the layers 16, 18 and 18, 20. For instance, the converging layer 18 may include a counter bore 102 or recess to receive the seal 100. Furthermore, the mixing layer 20 may include the counter bore 102 or recess to receive the seal 100. In this manner, a fluid-tight pathway between the inlet 22 and the outlet 58 may be maintained even in embodiments where the REM nozzle block 14 is formed from different layers 16, 18, 20 coupled together via fasteners 90.

As described above, the source jet 30 travels through the passage 38 toward the outlet 58. In the illustrated embodiment, the outlet 58 is approximately 1 mm in diameter, but in other embodiments the outlet 58 may be different sizes. The passage 54 extending through the mixing layer 20 may be surrounded by a pocket 104 to facilitate directing the fuel 64 to the micronozzles 66. In the illustrated embodiment, the pocket 104 has a diameter of approximately 5 mm, but it should be appreciated that the diameter may be different in other embodiments. The pocket 104 in the illustrated embodiment coupled to the micronozzles 66 which include the opening 68 having the inner diameter 80 of approximately 0.4 mm. In other embodiments, the inner diameter 80 may be larger or smaller. As described above, the fuel 64 directed to the micronozzles 66 via the inlet conduit 62, which has the inner diameter 78 of approximately 1 mm in the illustrated embodiment.

Figure 6:
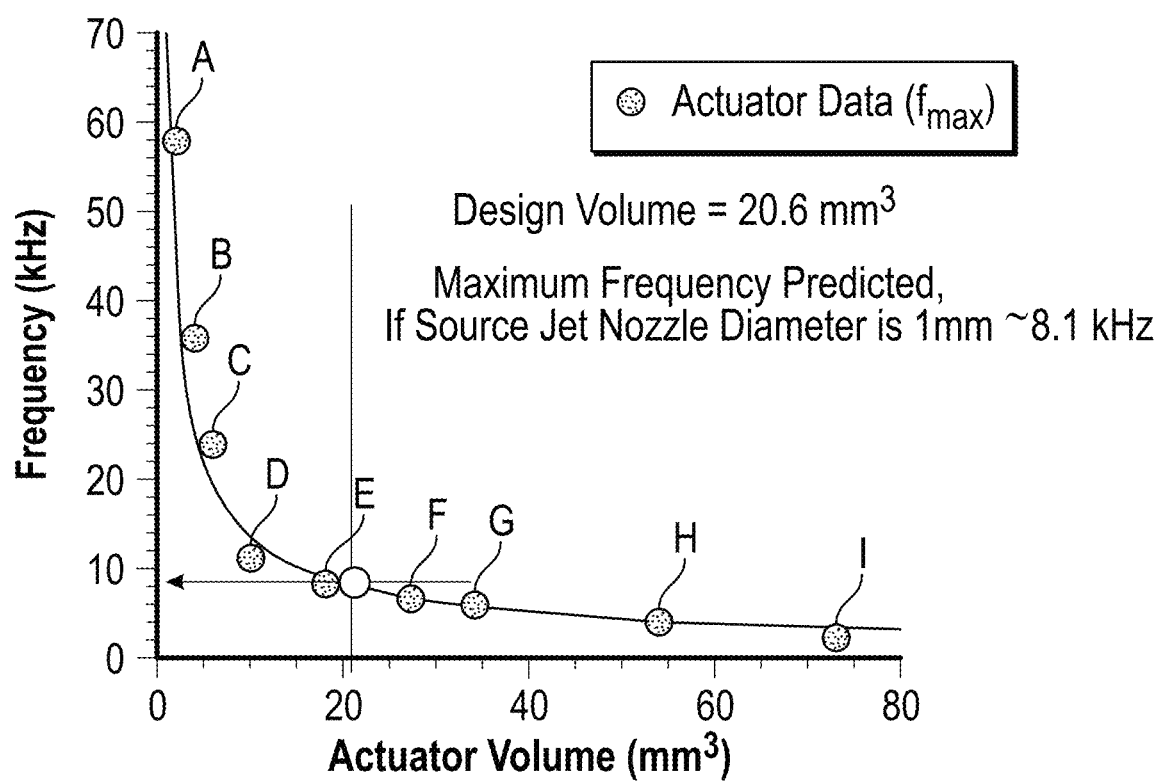
FIG. 6 is a graphical representation of a mathematical relationship between a volume of a REM nozzle and an output pulse frequency, in accordance with embodiments of the present disclosure.

FIG. 6 is a graphical representation of the internal cavity volume of the REM nozzle 12 and the pulsing frequency. In certain embodiments, there may be a correlation between the REM nozzle 12 maximum frequencies and its volume. As used herein, frequency describes the pulsing of the REM jet 82 from the outlet 58 to produce the compressible vortex 84. In certain embodiments, particularly selected geometric configurations of the embodiments described herein may enable frequencies between approximately 20 kHz and 70 kHz. As shown in FIG. 6, as volume increases the frequency decreases. Volume may be calculated by evaluating the volume of the cavity 32, chamber 36, passage 38, and passage 54. In the embodiment illustrated in FIG. 5, the volume is approximately 20.6 mm$^3$. As a result, the frequency is approximately 8.1 kHz. As should be appreciated by evaluating FIG. 6, different designs may enable different frequency responses and may be particularly selected based on the desired application.

Figure 7A:
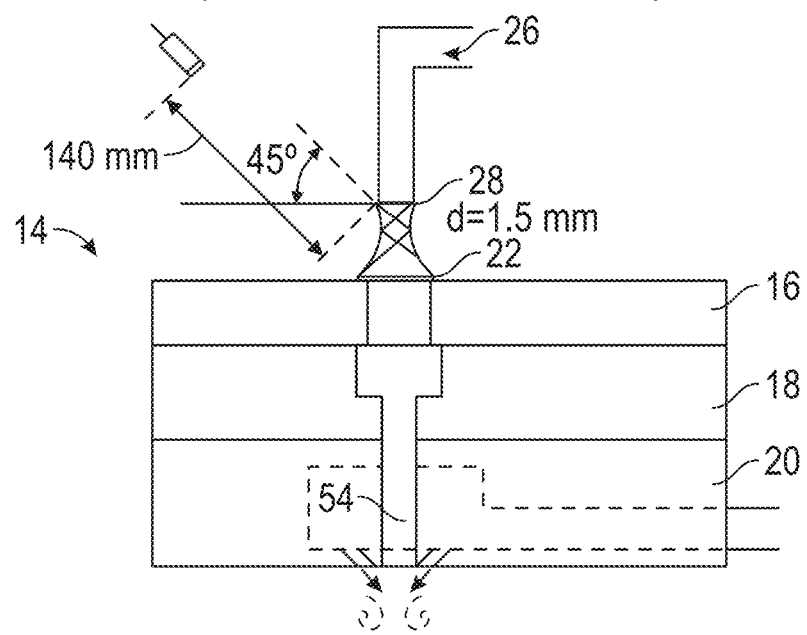
FIG. 7(A) is a schematic side elevational view of an embodiment of a REM nozzle and experimental configuration to test a source pulse frequency, in accordance with embodiments of the present disclosure.
Figure 7B:
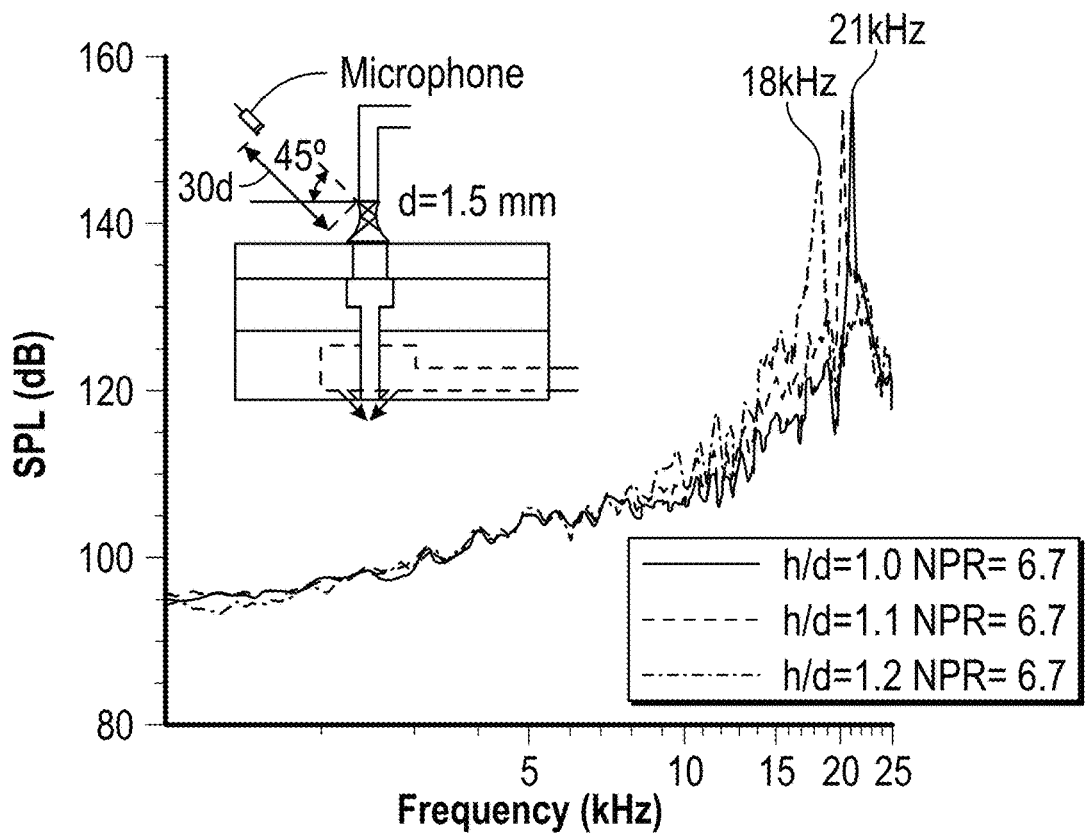
FIG. 7(B) is a graphical representation of a source pulse frequency, in accordance with embodiments of the present disclosure.

In certain embodiments, frequency and flow field characteristics may be adjusted by changing parameters of the design, such as features of the REM nozzle 12 and/or the source 26. For example, the nozzle pressure ratio (NPR) may be considered a ratio of supply pressure from the source 26 to the ambient pressure. In embodiments, the NPR may vary between 6.7 and 8.0, however other ratios may be used. Additionally, in certain embodiments, an entrance ratio may be defined as the distance 24 divided by the inner diameter of the outlet 28. In embodiments, the entrance ratio is varied between 1.0 and 1.6, however other ratios may be used. FIG. 7 illustrates frequency spectra from the REM nozzle 12. In embodiments, microphones positioned a distance away from the outlets 28, 58 are utilized to generate the frequency spectra. FIG. 7(A) illustrates the experimental set up including the microphone positioned approximately 140 mm away and at 45 degree angle from the outlet 28. FIG. 7(D) illustrates the experimental set up including the microphones positioned approximately 140 mm away and at 45 degrees angles from the outlets 28, 58.

Figure 7C:
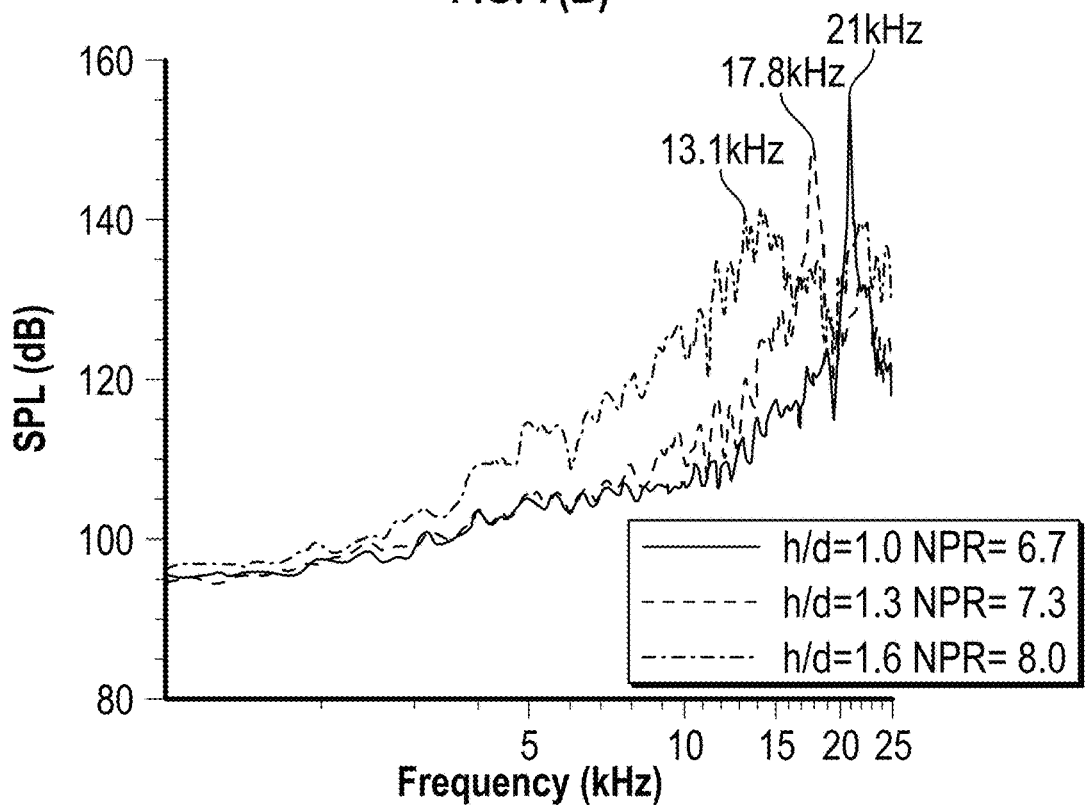
FIG. 7(C) is a graphical representation of a source pulse frequency, in accordance with embodiments of the present disclosure.
Figure 7D:
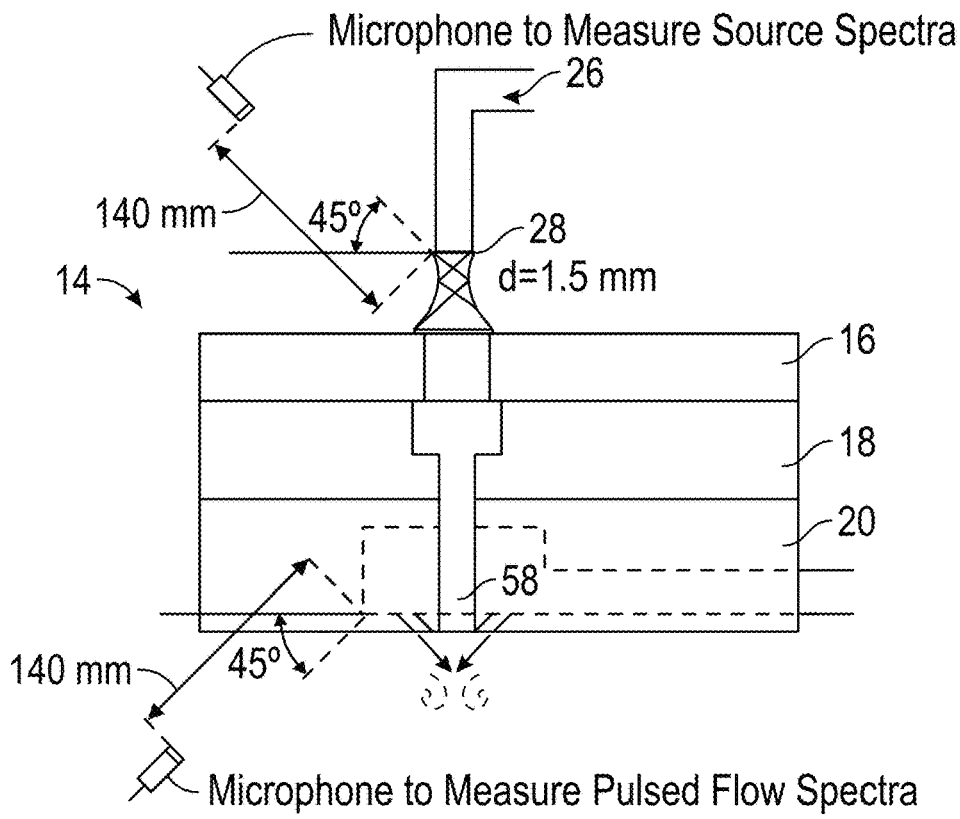
FIG. 7(D) is a schematic side elevational view of an embodiment of a REM nozzle and experimental configuration to test an output pulse frequency, in accordance with embodiments of the present disclosure.

When source 26 pressure is varied from NPR 6.7 to 8.0 (FIG. 7(C)) the frequency of the pulsing changes from 13.1 to 21.0 kHz. By keeping the NPR fixed at 6.7 (FIG. 7(B)) and varying the entrance ratio between 1.0 and 1.2 the frequency changes from 18 to 21 kHz. Accordingly, both the NPR and the entrance ratio may be utilized to fine tune the frequency tuning for the REM nozzle 12.

Figure 7E:
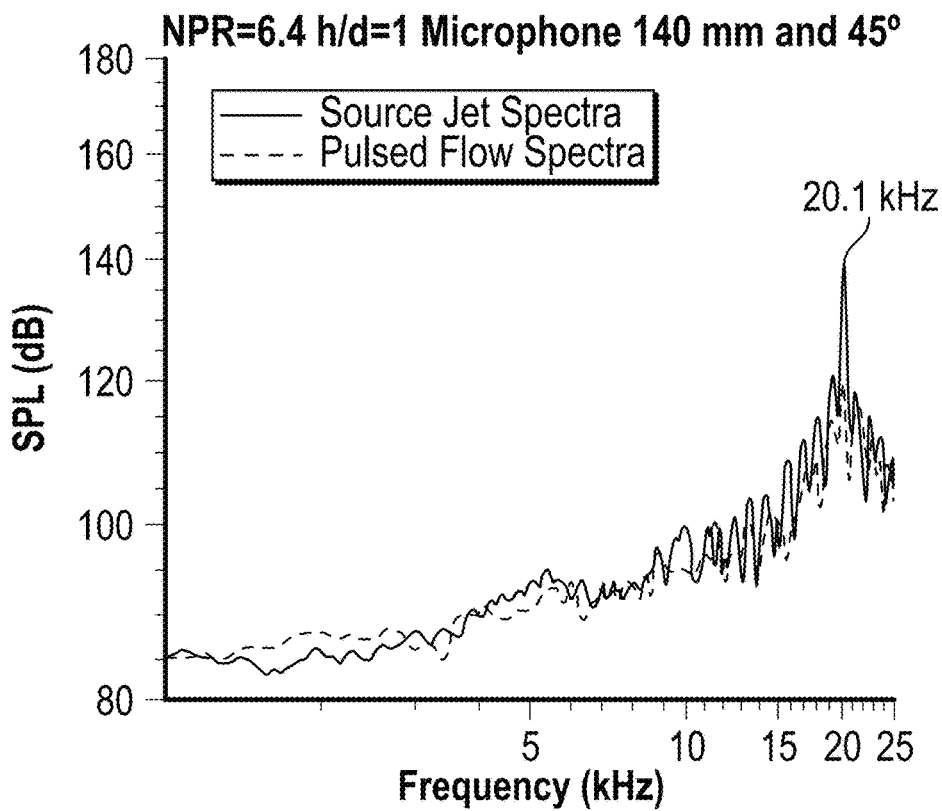
FIG. 7(E) is a graphical representation of pulse frequencies, in accordance with embodiments of the present disclosure.
Figure 7F:
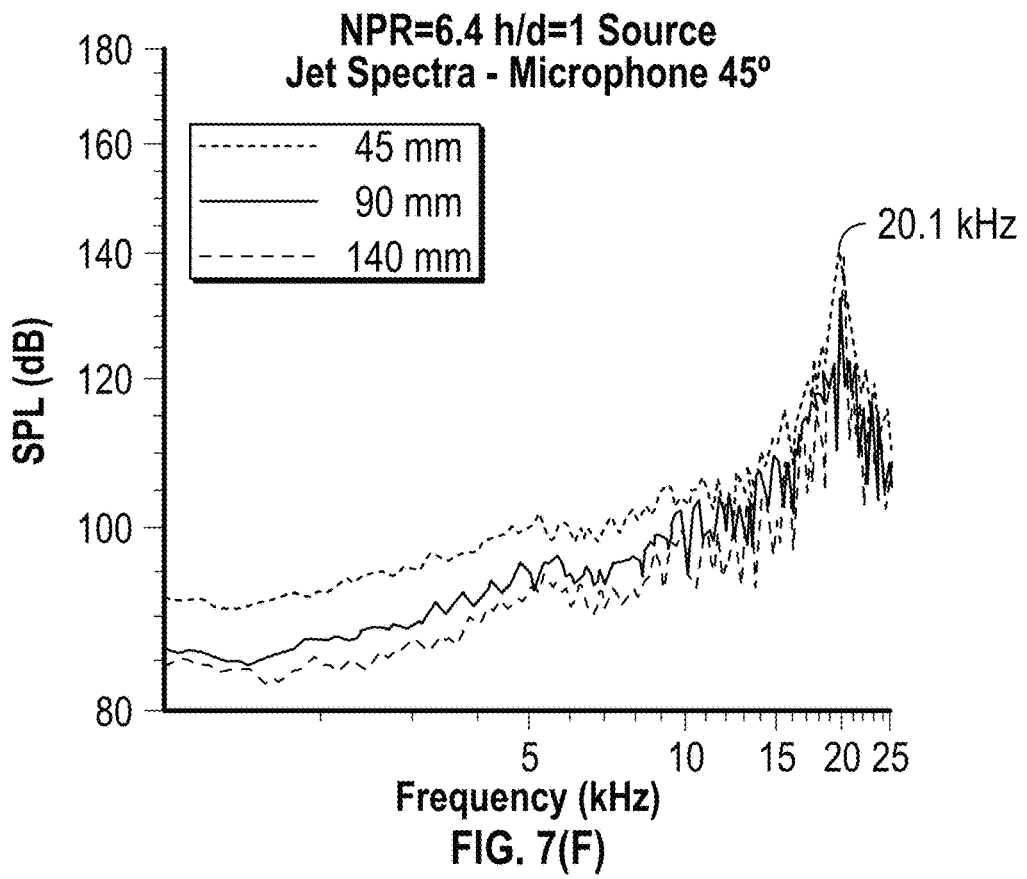
FIG. 7(F) is a graphical representation of a source jet spectra, in accordance with embodiments of the present disclosure.
Figure 7G:
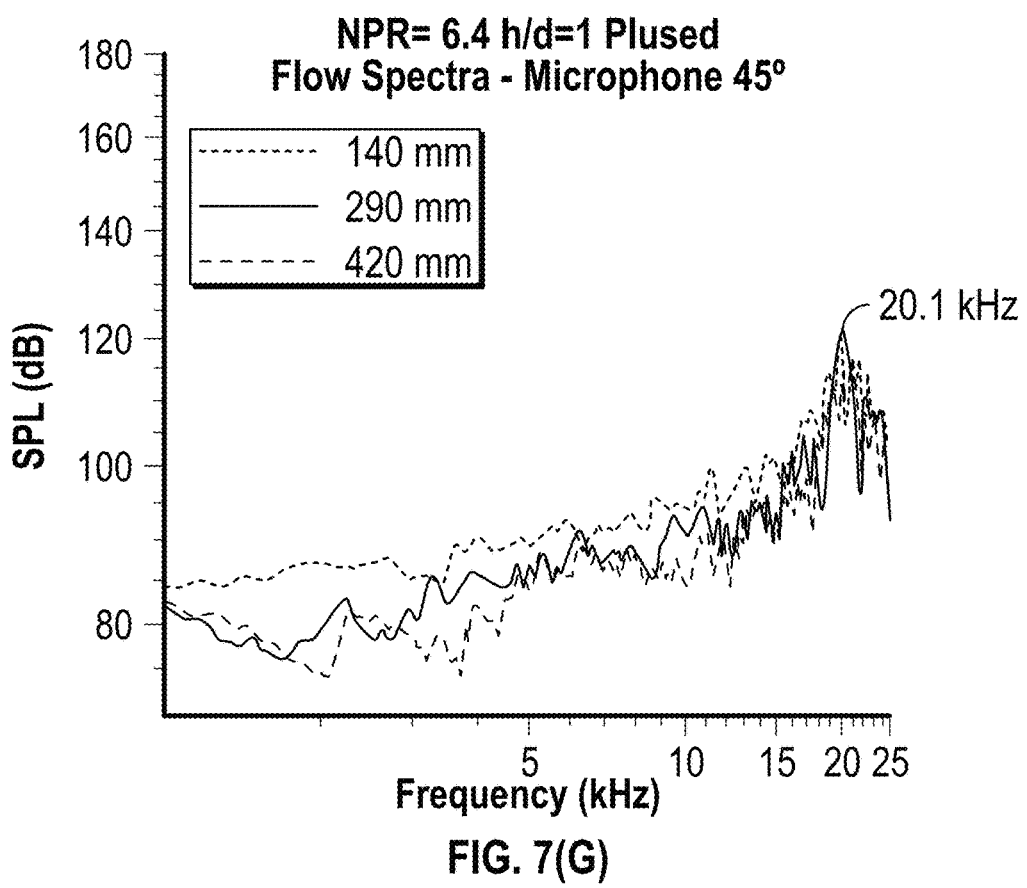
FIG. 7(G) is a graphical representation of a pulsed flow spectra, in accordance with embodiments of the present disclosure.

As illustrated in FIGS. 7(E)-(G), the SPL spectra of the REM nozzle 12 illustrates that strong acoustic waves are generated by the pulsing supersonic jet in the nearfield. Moreover, the REM nozzle 12 can provide high amplitude unsteady actuator to the jets to be injected and to be mixed, in certain embodiments. As illustrated, the REM nozzle 12 flowfield spectra indicates that the amplitude of the maximum frequency response is more than 50 dB above the broadband noise level (e.g., the noise where energy is distributed over a wide section of the audible range). The same oscillating frequency of 20.1 kHz discussed above is also present near the outlet 58.

FIG. 8 is a series of Schlieren Images illustrating the compressible vortex 84 generated by the REM jet 82 at the outlet 58. In the illustrated embodiment, the outlet 28 has a diameter of approximately 1.5 mm and the outlet 58 has a diameter of approximately 1.0 mm. Further, the illustrated images were generated from a system including an NPR of 6.7 and an entrance ratio of 1.0 such that the pulsing was at approximately 21 kHz.

FIG. 8(A) shows the beginning of the pulsing phase of the actuator (e.g., REM nozzle 12) jet. The compressible vortex 84 begins to appear with a bow shock upstream of the flow. FIG. 8(B) shows evolution of the compressible vortex 84 further downstream. It is evident that the evolving jet is supersonic with the presence of shock cells and oblique shock patterns in the flow. FIGS. 8(C) and 8(D) illustrate further evolution of this pulsing supersonic jet. As the jet evolves, it entrains more fluid and diffuses downstream. The source jet oscillations are marked by unsteadiness in the flow structure formed by the first shock cell, the impinging normal shock, and Mach disc. The pulsing of flow at the bottom side creates the compressible vortex 84 that evolves and moves downstream at this ultrasonic frequency and at a supersonic speed. As illustrated, no fuel 64, such as $CO_2$, is injected into the micronozzles 66.

FIG. 9 is a series of Schlieren Images illustrating the fuel 64 injected through the micronozzles 66. In the illustrated embodiment, the fuel 64 is injected at 20 psi through the micronozzles 66 arranged about the outlet 58, as described with reference to FIG. 4. As shown in the figures, the jets converge to the axis 76 and then merge to form jet structures.

FIG. 10 is a series of Schlieren Images illustrating injection of both the source jet 30 and the fuel 64. In the illustrated embodiment, the fuel 64 is $CO_2$ injected at 20 psi with the pulsed air jet (e.g., source 26) operating at 21 kHz. As illustrated, the REM jet 82 (e.g., the pulsed air jet) entrains the $CO_2$ jet and grows downstream with high speed and at an ultrasonic frequency of 21 kHz. As a result, such mixing may be utilized for high speed mixing applications, such as jet engines.

Figure 11:
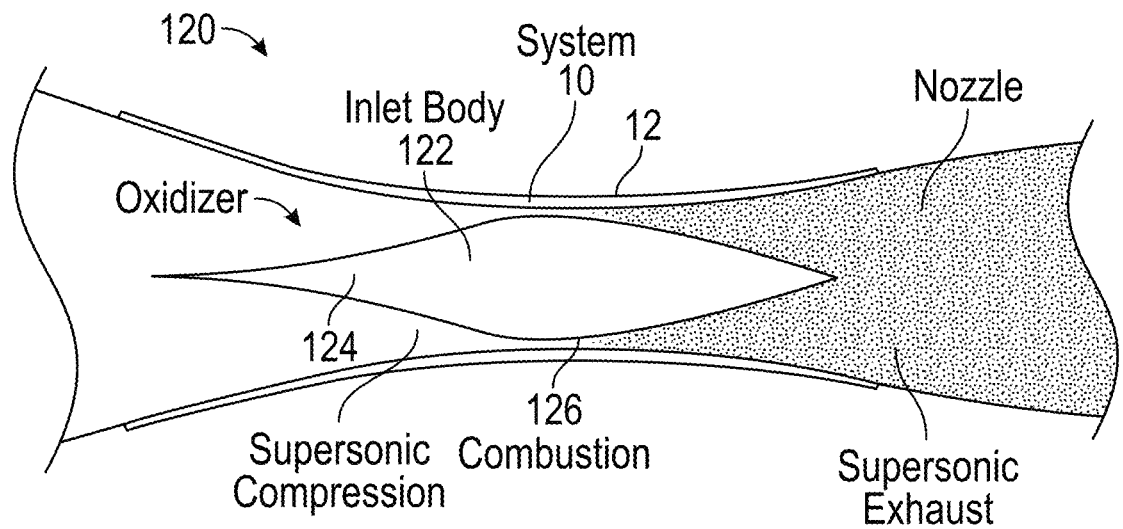
FIG. 11 is a schematic diagram of a scramjet engine, in accordance with embodiments of the present disclosure.

FIG. 11 is a schematic diagram of the system 10 including the REM nozzle 12 integrated with a scramjet engine 120. The scramjet engine 120 operates by accelerating an oxidizer, such as air, toward an inlet body 122. The high speed of the scramjet engine 120 serves to compress the oxidizer without additional equipment, such as a compressor that may be utilized for gas turbine power systems. The inlet body 122 includes a diverting section 124 that facilitates compression of the oxidizer. The scramjet engine 120 also includes a combustion chamber 126, which is where the oxidizer is mixed with the fuel 64 via the system 10. Due to the speed at which the oxidizer is traveling, the fuel 64 should mix with the oxidizer quickly, often in fractions of a second (e.g., 2-10 milliseconds). Thereafter, exhaust is released to further provide thrust energy to the scramjet engine 120. By utilizing the system 10, the fuel 64 entrained in high frequency oxidizer vortex 84 may be efficiently driven into the combustion chamber 126 for combustion with the incoming free stream oxidizer. Furthermore, due to the speed at which scramjet engines 10 typically operate, heat may lead to failure or malfunction of electronic equipment. The system 10 described herein does not utilize extensive electronic equipment of moving parts, and rather, much like the scramjet engine 120, utilizes geometry to pulse the fuel 64 into the combustion chamber 126 with efficient mixing and at fast speeds.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. An injection system, comprising:
    a Resonance Enhanced Microjet (REM) nozzle, comprising:
        a REM nozzle block, the REM nozzle block having an inlet formed in a top and an outlet formed in a bottom, the inlet and outlet being fluid coupled together, one or more micronozzles positioned about the outlet, the one or more micronozzles having an outlet and being positioned at an angle relative to the bottom, an inlet conduit coupled to the REM nozzle block, the inlet conduit being fluidly coupled to the one or more micronozzles, an inlet layer having the inlet formed therein, a converging layer stacked below the inlet layer and having a first outlet, and a mixing layer stacked below the converging layer, the mixing layer including:
            a passage from the first outlet to the outlet formed in the bottom,
            the inlet conduit,
            a pocket surrounding the passage and being fluid coupled to the inlet conduit, and
            the one or more micronozzles being below the pocket, each micronozzle comprising an opening fluid coupled to the pocket;
        a source arranged proximate the top, the source directing a source jet of fluid into the inlet; and
        a fuel supply fluidly coupled to the inlet conduit.
2. The injection system of claim 1, wherein a fuel from the fuel supply is injected under pressure, the fuel being entrained in an oxidizer.
3. The injection system of claim 1,
    wherein each micronozzle is formed in the REM nozzle block below the pocket and being fluid coupled to the pocket to receive fuel from the fuel supply.

4. The injection system of claim 3, wherein the inlet conduit enters the REM nozzle block along a side that is perpendicular to the top.

5. The injection system of claim 3, wherein the outlet formed in the bottom is chamfered back into the REM nozzle block.

6. The injection system of claim 1, wherein:
the inlet layer comprises a cavity;
the converging layer further comprises a chamber and a passage, the passage includes the first outlet; and
the REM nozzle block has a volume calculated as a function of the cavity of the inlet layer, the chamber and the passage of the converging layer and the passage of the mixing layer.

7. The injection system of claim 6, wherein the REM nozzle block has a frequency that has an inverse correlation to the volume of REM nozzle block.

8. The injection system of claim 7, wherein the volume is 20.6 $mm^3$.

9. The injection system of claim 1, wherein the REM nozzle block has a frequency that is in a range of 20 kHz and 70 kHz.

10. The injection system of claim 9, wherein:
the frequency has an inversely correlation to an internal cavity volume of REM nozzle block; and
the volume is 20.6 $mm^3$.

11. The injection system of claim 1, wherein:
the inlet receives a pulsed air jet;
the outlet formed in the bottom outputs a compressible vortex of the pulsed air jet; and
the one or more micronozzles output fuel from the fuel supply.

12. The injection system of claim 1, wherein the inlet conduit enters the REM nozzle block along a side that is perpendicular to the top.

13. An injection system, comprising:
a Resonance Enhanced Microjet (REM) nozzle, comprising:
a REM nozzle block, the REM nozzle block having an inlet formed in a top and an outlet formed in a bottom, the inlet and outlet being fluid coupled together, a plurality of micronozzles positioned about the outlet, the plurality of micronozzles having an outlet and being positioned at an angle relative to the bottom, an inlet conduit coupled to the REM nozzle block, the inlet conduit being fluidly coupled to the plurality of micronozzles, an inlet layer having the inlet formed therein, a converging layer stacked below the inlet layer and having a first outlet, and a mixing layer stacked below the converging layer, the mixing layer including:
a passage from the first outlet to the outlet formed in the bottom,
the inlet conduit,
a pocket surrounding the passage and being fluid coupled to the inlet conduit, and
the plurality of micronozzles being below the pocket, each micronozzle comprising an opening fluid coupled to the pocket;
a source arranged proximate the top, the source directing a source jet of fluid into the inlet; and
a fuel supply fluidly coupled to the inlet conduit.

14. The injection system of claim 13, wherein:
the inlet layer comprises a cavity;
the converging layer further comprises a chamber and a passage, the passage includes the first outlet; and
the REM nozzle block has a volume calculated as a function of the cavity of the inlet layer, the chamber and the passage of the converging layer and the passage of the mixing layer.

15. The injection system of claim 14, wherein the REM nozzle block has a frequency that has an inverse correlation to the volume of REM nozzle block.

16. The injection system of claim 13, wherein:
the inlet layer comprises a cavity having a cavity diameter;
the converging layer has a chamber having a chamber diameter larger than the cavity diameter; and
the first outlet has a first outlet diameter smaller than the cavity diameter.

* * * * *